US009523998B2

(12) United States Patent
Sukonthapanich (10) Patent No.: US 9,523,998 B2
(45) Date of Patent: Dec. 20, 2016

(54) SAFETY RELEASE SYSTEM FOR PEDALS

(71) Applicant: Ventra Group, Inc., Bradford, Ontario (CA)

(72) Inventor: Dusit Sukonthapanich, Bradford (CA)

(73) Assignee: VENTRA GROUP CO., Halifax, Novia Scotia (CA)

(*) Notice: Subject to any disclaimer, the term of this patent is extended or adjusted under 35 U.S.C. 154(b) by 708 days.

(21) Appl. No.: 13/831,245

(22) Filed: Mar. 14, 2013

(65) Prior Publication Data

US 2014/0260766 A1    Sep. 18, 2014

(51) Int. Cl.
| | | |
|---|---|---|
| G05G 1/30 | (2008.04) | |
| G05G 1/327 | (2008.04) | |
| B60T 7/04 | (2006.01) | |
| B60T 7/06 | (2006.01) | |
| B60R 21/09 | (2006.01) | |
| G05G 1/323 | (2008.04) | |

(52) U.S. Cl.
CPC .............. *G05G 1/327* (2013.01); *B60R 21/09* (2013.01); *B60T 7/065* (2013.01); *G05G 1/323* (2013.01); *Y10T 74/20528* (2015.01)

(58) Field of Classification Search
CPC .......... G05G 1/323; G05G 1/327; G05G 1/32; G05G 1/30; G05G 1/46; B60T 7/065; B60T 7/06; B60T 7/04; B60R 21/09
USPC ...... 74/512, 513, 519, 560, 473.16; 180/275, 180/277–278
See application file for complete search history.

(56) References Cited

U.S. PATENT DOCUMENTS

| | | |
|---|---|---|
| 5,615,749 A | 4/1997 | Kato |
| 5,921,144 A | 7/1999 | Williams |
| 5,983,746 A | 11/1999 | Nawata et al. |
| 5,996,440 A | 12/1999 | Nawata |
| 6,041,674 A | 3/2000 | Kato |
| 6,055,883 A | 5/2000 | Kato |
| 6,070,488 A | 6/2000 | Yabusaki |
| 6,070,489 A | 6/2000 | Ananthasivan |

(Continued)

FOREIGN PATENT DOCUMENTS

| | | | |
|---|---|---|---|
| DE | 10 2007 032515 A1 | | 2/2009 |
| EP | 0659615 A1 | | 6/1995 |

(Continued)

OTHER PUBLICATIONS

First Examination Report dated Apr. 28, 2014 of European Appl. No. 14159229.5 (7 pages).

*Primary Examiner* — Adam D Rogers
(74) *Attorney, Agent, or Firm* — Pillsbury Winthrop Shaw Pittman, LLP (57) ABSTRACT

Provided herein is a pedal assembly for a vehicle with an intermediate link releasably connected to an actuation link of a push rod. The push rod is connected to a pedal arm via the actuation link and the intermediate link. The intermediate link has two parallel links that are capable of movement from a first position to a second position during vehicle collision using a release lever. Upon rotation to its second position, the release lever disconnects and forces the parallel links of the intermediate link away from each other, thus disconnecting the push rod and pedal arm. Energy is prevented from being transmitted to the driver's foot, thereby reducing injury to the driver. An actuation mechanism, such as a reaction bracket, is mounted to a vehicle structure adjacent the release lever, and may actuate rotation of the lever.

26 Claims, 9 Drawing Sheets (56) References Cited

U.S. PATENT DOCUMENTS

| | | |
|---|---|---|
| 6,076,422 A | 6/2000 | Tabata |
| 6,082,219 A | 7/2000 | Wolpert |
| 6,089,119 A | 7/2000 | Leboisne |
| 6,089,342 A | 7/2000 | Muller |
| 6,101,894 A | 8/2000 | Tiemann |
| 6,112,615 A | 9/2000 | Nawata |
| 6,112,616 A | 9/2000 | Schonlau |
| 6,142,036 A | 11/2000 | Mizuma |
| 6,176,340 B1 | 1/2001 | Mizuma et al. |
| 6,178,846 B1 | 1/2001 | Specht |
| 6,182,525 B1 | 2/2001 | Bowers |
| 6,182,526 B1 | 2/2001 | Brooks |
| 6,186,025 B1 | 2/2001 | Engelgau |
| 6,209,416 B1 | 4/2001 | Tiemann |
| 6,279,417 B1 | 8/2001 | Mizuma |
| 6,336,376 B1 | 1/2002 | Lee |
| 6,354,171 B1 | 3/2002 | Wolpert |
| 6,364,046 B1 | 4/2002 | Forssell |
| 6,375,220 B1 | 4/2002 | Kamm |
| 6,393,934 B1 | 5/2002 | Rixon et al. |
| 6,408,711 B1 | 6/2002 | Mizuma |
| 6,418,812 B2 | 7/2002 | Mizuma |
| 6,481,311 B1 | 11/2002 | Sanagi |
| 6,539,823 B1 | 4/2003 | Tomono |
| 6,565,160 B1 | 5/2003 | Ewing |
| 6,571,659 B2 | 6/2003 | Choi |
| 7,261,015 B2 * | 8/2007 | Williams et al. ............... 74/512 |
| 7,665,565 B2 | 2/2010 | Tokumo et al. |
| 7,775,555 B2 | 8/2010 | Allen et al. |
| 7,987,743 B2 | 8/2011 | Sukonthapanich |
| 8,196,695 B2 | 6/2012 | Kim et al. |
| 8,276,478 B2 | 10/2012 | Tokumo et al. |

FOREIGN PATENT DOCUMENTS

| | | |
|---|---|---|
| EP | 1 074 445 A2 | 2/2001 |
| EP | 1 323 602 A1 | 7/2003 |
| EP | 2 540 579 A1 | 1/2013 |
| JP | 2000-313319 A | 11/2000 |

* cited by examiner

SAFETY RELEASE SYSTEM FOR PEDALS

BACKGROUND

Field of Invention

The present invention is generally related to a pedal assembly of a vehicle, and, more particularly, a pedal assembly having a mechanism for reducing injury to a driver during or after a collision or impact.

Description of Related Art

A pedal, such as a brake pedal, is mounted to a dash panel in a vehicle so as to provide a driver easy access and manipulation via his/her foot. However, in case of impact, the brake pedal may potentially cause damage to the driver's lower extremities, including the foot, ankle, shin, and/or knee, particularly when the driver is pushed forward toward the front of the vehicle via inertia and other forces. Thus, the ability to decouple pedals from the dash panel has been developed.

Generally, devices or assemblies for moving or decoupling a pedal in a vehicle are known in the art. Some current methods rely on a large number of parts to perform this function. Also, some current methods provide methods for breaking a connection of the pedal to the vehicle. However, these methods generally describe breaking a joint to the extent that the pedal will not function after the crash. Rendering a pedal assembly inoperable is inconvenient and costly to a driver.

FR Patent 2841011 illustrates an example of a pedal decoupler as known in the art with a releasable connection that may be released on vehicle impact. The FR 2841011 design includes a cable which requires tension to activate the crash feature, yet must remain slacked to ensure proper operation during typical pedal use. Such a design increases the possibility that the cable could get caught, or foul on something under the dash, thus preventing the system from functioning or engaging at an inopportune time.

Additionally, because the cable requires such tension for activation, the FR '011 patent is limited as to where a location for mounting can be placed in the vehicle. Prior art designs of such pedal assemblies may be limited in their locations for mounting due to the number of parts required for assembly, or due to inefficient design (e.g., some designs must be placed above and/or forward of the pedal assembly). For example, such pedal assemblies, such as that shown in FR 2841011, may require a substantial number of parts and devices, which in turn may require some clearance with regard to other parts in order to prevent the parts/devices from jamming in the event of a crash.

U.S. Pat. No. 7,987,743 B2, which is hereby incorporated by reference in its entirety and is assigned to the same assignee as the present application, illustrates an example of another pedal decoupler system.

SUMMARY

One aspect of the invention provides a pedal assembly for operating a push rod that activates a functional system of a vehicle. The pedal assembly includes a pedal arm comprising an elongated structure; an intermediate link having a first link and a second link in a parallel configuration; an actuation link; and a pedal plate provided on a second end of the elongated structure of the pedal arm. The pedal plate is accessible by a foot of a driver. A first end of each of the first and second links of the intermediate link is connected to the actuation link and a second end of each of the first and second links is pivotally connected to a first end of the elongated structure of the pedal arm. Pivotal movement of the pedal arm is configured to pivotally move the intermediate link, and pivotal movement of the intermediate link is configured to actuate pivotal movement of the actuation link. The actuation link is configured to connect a push rod to the intermediate link and to enable pushing of the push rod via pivotal movement of the intermediate link as a result of pivoting of the pedal arm. A release mechanism includes a release lever and an actuation mechanism. The release lever is configured to pivot between a first position and a second position. The release lever has a contact portion that can be contacted to pivot the release lever between the first and second positions. The release lever is configured to disconnect the first and second links of the intermediate link from the actuation link in the second position by forcing the first and second links relatively apart so as to disconnect from the actuation link. The actuation mechanism is configured to mount to a vehicle structure in spaced relation to the contact portion of the release lever. The actuation mechanism is configured to contact the contact portion during a vehicle collision and to actuate the pivoting of the release lever from the first position to the second position to disconnect the first and second links of the intermediate link from the actuation link.

Another aspect of the invention provides a vehicle having a pedal assembly, the pedal assembly includes a pedal arm comprising an elongated structure; an intermediate link having a first link and a second link in a parallel configuration; an actuation link; and a pedal plate provided on a second end of the elongated structure of the pedal arm. The pedal plate is accessible by a foot of a driver. A first end of each of the first and second links of the intermediate link is connected to the actuation link and a second end of each of the first and second links is pivotally connected to a first end of the elongated structure of the pedal arm. Pivotal movement of the pedal arm is configured to pivotally move the intermediate link, and pivotal movement of the intermediate link is configured to actuate pivotal movement of the actuation link. The actuation link is configured to connect a push rod to the intermediate link and to enable pushing of the push rod via pivotal movement of the intermediate link as a result of pivoting of the pedal arm. A release mechanism includes a release lever and an actuation mechanism. The release lever is configured to pivot between a first position and a second position. The release lever has a contact portion that can be contacted to pivot the release lever between the first and second positions. The release lever is configured to disconnect the first and second links of the intermediate link from the actuation link in the second position by forcing the first and second links relatively apart so as to disconnect from the actuation link. The actuation mechanism is configured to mount to a vehicle structure in spaced relation to the contact portion of the release lever. The actuation mechanism is configured to contact the contact portion during a vehicle collision and to actuate the pivoting of the release lever from the first position to the second position to disconnect the first and second links of the intermediate link from the actuation link.

Other features and advantages of the present invention will become apparent from the following detailed description, the accompanying drawings, and the appended claims.

DETAILED DESCRIPTION OF THE PREFERRED EMBODIMENT(S)

The herein disclosed pedal assembly has an intermediate link releasably connected to an actuation link of a push rod. The push rod is connected to a pedal arm via the actuation link and the intermediate link. Under regular operating circumstances, the pedal assembly is connected to a pushrod via the links. The geometry and shape of the parts are such that, in the event of a crash, the release lever is struck by an actuation mechanism (e.g., bracket) mounted to the vehicle's structure adjacent the release lever. The reaction bracket will then cause the release lever to rotate and disconnect the pedal parts from the pushrod. Specifically, as described in greater detail below, the intermediate link has two parallel links that are capable of movement from a first position to a second position during vehicle collision using a release lever. Upon rotation to its second position, the release lever disconnects the first and second links of the intermediate link from the actuation link in the second position by forcing the first and second links relatively apart so as to disconnect from the actuation link, thus disconnecting the pushrod and pedal arm. Disconnection of the pedal assembly reduces and/or prevents energy from being transmitted to the driver's foot, thereby reducing injury to the driver.

Figure 1:
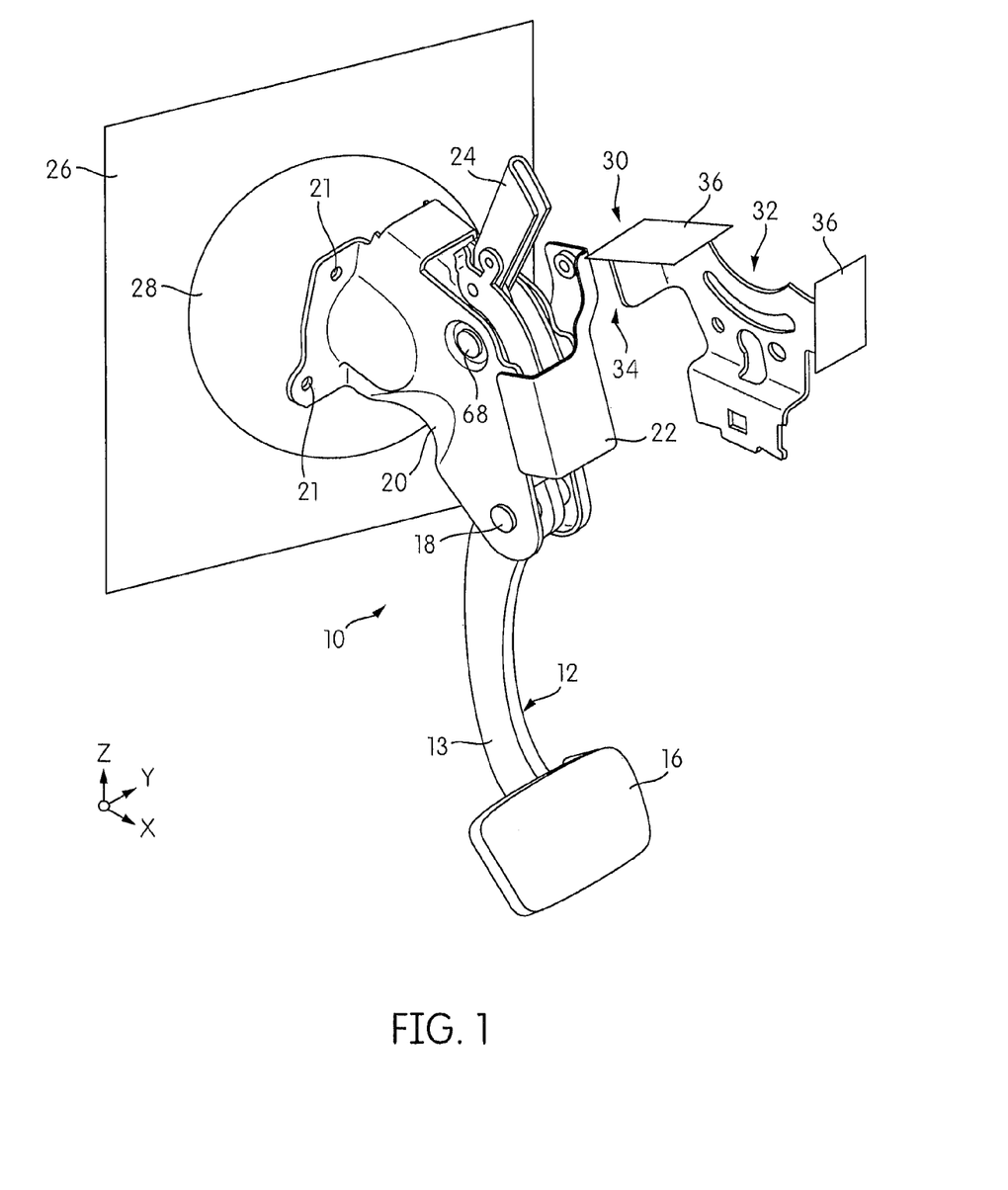
FIG. 1 illustrates a perspective view of a pedal structure with release mechanism mounted in a vehicle in accordance with an embodiment of the present invention.

FIG. 1 illustrates a perspective view of a pedal assembly 10 or "pedal" with release mechanism 30 in accordance with an embodiment of the present invention. The pedal assembly 10 as described herein is designed such that its assembly or structure disengages or disconnects from a part of the vehicle in the event of impact, crash or collision, such as with another object. For simplicity purposes only, such events will be referred to herein as "incidents." Of course, the term incidents should not be limiting, and should be understood to include impact with an object or another vehicle in which forces are great enough to cause injury to a driver or user of a vehicle.

More specifically, during an incident, the pedal 10 may be released for movement with respect to a vehicle structure, so that, upon compression of the vehicle structure and forced movement of its parts and a front end of the vehicle, injury to a driver is reduced. Energy is prevented from being transmitted to the foot of the driver, thereby reducing injury to the driver. Injury or damage to the driver's body, particularly one's lower extremities including ankles or knees, may be caused by movement of the vehicle parts and/or movement of the driver as a result of the forces caused by the incident. For example, the driver or user may be forced via inertia in a forward direction toward a vehicle's instrument panel and/or dash board (i.e., because in a front end crash the remainder of the vehicle can travel forward as the front end is crushed). Additionally, during an incident, injury to a driver may be exacerbated, particularly when the pedal 10 is a brake pedal, and the brake push rod may be driven relatively rearwardly to force the pedal against the driver's lower extremity during the incident. That is, because of the natural tendency for the driver to be pressing down on the pedal to apply the brakes to the vehicle, the driver may be subjected to greater injury as a result of the forces and relative movement of the pedal, vehicle parts, and himself/herself caused by the incident. Thus, the decoupling or disconnecting of the push rod 14 of the pedal assembly 10 as herein described thereby aims to substantially reduce or eliminate such injury or damage by releasing at least a part of the pedal's mounting location.

Generally speaking, the terms "pedal", "pedal assembly", or "pedal structure" used interchangeably throughout this specification are not intended to be limiting to a specific type of pedal device, but intended to be used as a crash decoupling device for brake and/or clutch pedals. It can be used for a brake pedal, in which case it disconnects the pedal from a brake booster, or for a clutch pedal, in which case it disconnects the pedal from the clutch master cylinder of a transmission system of a vehicle. The pedal may be used with any functional system (e.g., brake system, transmission) of the vehicle. Also, the materials used to manufacture the pedal assembly should not be limiting. The pedal and its parts could be made from steel (tubular or blade-type) or plastic materials, for example.

Referring now more particularly to the drawings, the pedal assembly 10, shown in FIG. 1, is a brake pedal 10 connected to a brake booster 28. For explanatory purposes only, the pedal 10 is described with reference to a braking system, but should not be limited to such. As noted above, the pedal assembly 10 may be also connected to parts of a clutch assembly, for example. The pedal assembly 10 is provided in the vehicle such that it is easily accessible by a driver. For example, in some cases, the pedal assembly 10 is mounted in relation to panels of a dashboard 36 and/or an instrument panel (IP). The dashboard 36 of the vehicle, also referred to as the "dash", may comprise an upper panel and a lower panel that are connected to each other (e.g., using methods or devices known in the art). In some embodiments, the upper dash panel and lower dash panel may comprise a uniform or single piece. The panels are generally connected to a plurality of devices of the vehicle. For example, the dash 36 may be connected to another vehicle structure 26, sometimes referred to as a front of dash (on a lower side or underside) or a firewall. A brake booster 28 of the brake system is fixed to the front of the dash panel or firewall 26 and to brake pedal 10 via a push rod 14 (described in detail below).

The pedal assembly 10 comprises a pedal arm 12. Pedal arm 12 has an elongated pedal structure 13 that is configured to be pivotally mounted at a first end, and has a pedal plate 16 provided on (or attached to) its second end. In some embodiments, the elongated structure 13 may be pivotally connected to a pedal bracket 20 via a pin or shaft 18. Pedal bracket 20 may optionally be a bracket used for mounting to the vehicle structure 26, using fasteners within its holes 21 in mounting portion 20A, and/or in cooperation with other brackets, for connecting the pedal arm 12 to the vehicle. Of course, the devices used and their design are not meant to be limiting; thus, alternate designs and assemblies for connecting a pedal to a vehicle may be used and would not be considered beyond the scope of the present disclosure. Referring back to FIG. 3, the pedal bracket 20 may be connected at a first end to a part of vehicle structure 26 via a mounting portion 20A. Pedal bracket 20 may be connected to panels of the vehicle (or the dash, in general) using conventional fastening devices such as nuts and bolts, or by other methods such as welding. As such, the mounting of the pedal bracket 20 to the vehicle is not meant to be limiting. In addition to mounting the pedal assembly 10, the pedal bracket 20 may act as a casing surrounding at least a portion of the intermediate link of the pedal assembly and is configured to limit movement of the first and second links of the intermediate link when they are disconnected. Additional details of the disconnection of pedal parts are described further below.

A cover or reinforcement bracket 22 can also be provided and connected to pedal bracket 20 and/or one of the vehicle structures, e.g., structure 36, using a fastener 23 and/or nut assembly. The reinforcement bracket 22 reinforces the pedal bracket 20 and protects the assembly contained therein.

The pedal plate 16 or part at the second end of the elongated structure 13 is accessible by a foot of the driver or user such that an application of force by the driver's or user's foot may be applied thereto. During normal operation, a driver or user of a vehicle may apply force via his foot on the pedal plate 16 to activate a functional system of the vehicle (e.g., brake booster 28 of the brake system). "Normal" operation circumstances as referred to throughout this description is defined by a time during which a vehicle is being operated safely and without incidence of impact such as caused by a crash or collision with another vehicle, person, or object. Thus, in the embodiment being described herein, the force from a driver or user's foot is configured to cooperate with brake booster 28 to translate pivotal motion into a braking force to be applied to the wheels of the vehicle. Such methods for applying a braking force (and the pivotal translation) are known in the art and therefore not discussed in detail herein.

Specifically, the push rod 14 is configured to activate the functional system (e.g., braking device) of the vehicle. The push rod 14 is connected to the brake booster 28 through the vehicle structure 26. The push rod is connected to a spring or similar mechanism inside the brake booster 28, for example. The push rod 14 translates the pivoting force applied by the foot of the driver as he pushes on the pedal plate 16 to the brake booster 28 via connecting device 15. That is, under normal operation, as the pedal arm 12 rotates about a primary pivot pin 18 with respect to the dash 36 and vehicle structure 26, at least a part of the push rod 14 is moved to apply a braking force. Generally, when force is applied, the spring or mechanism of the brake booster 28 is compressed.

Figure 2:
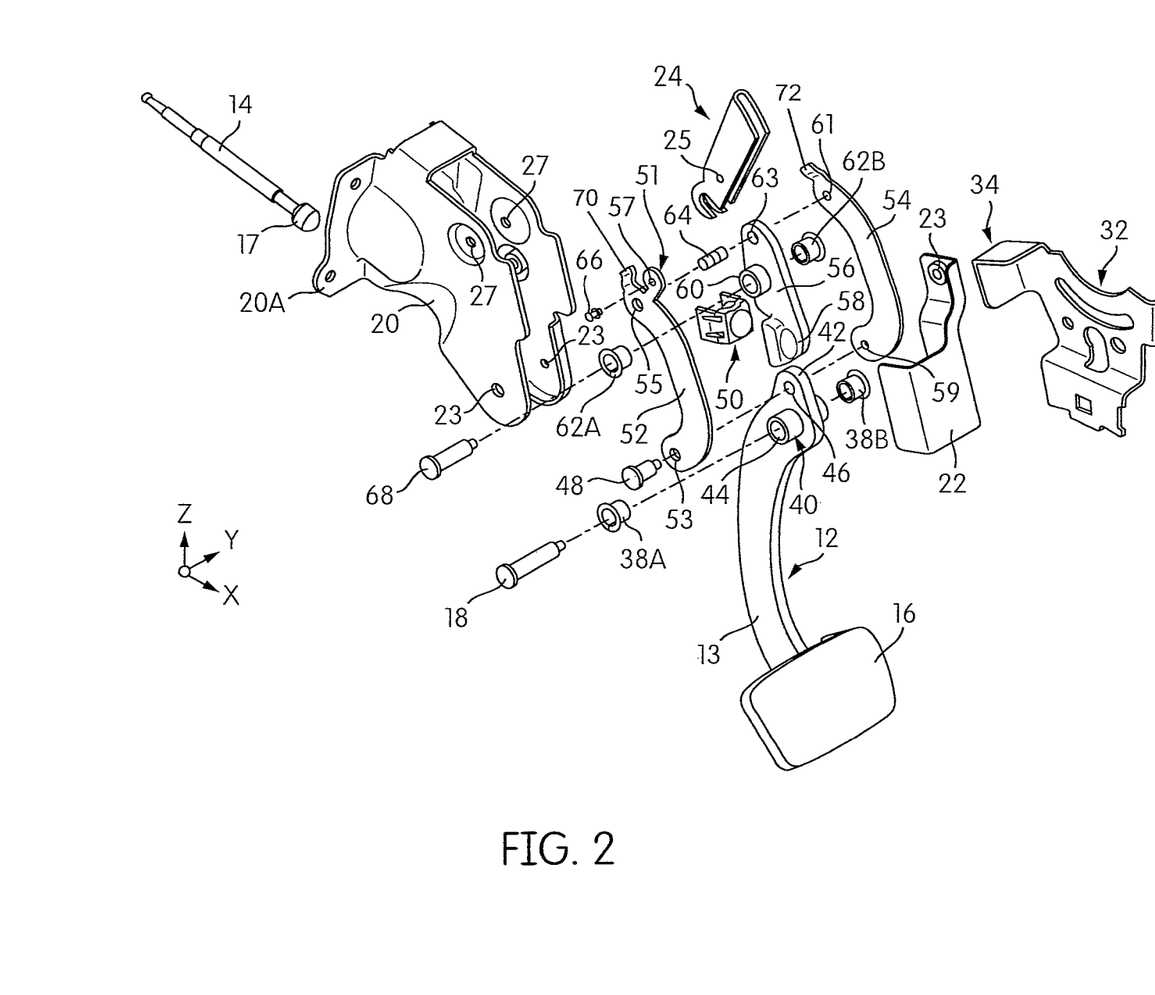
FIG. 2 illustrates an exploded view of the pedal structure of FIG. 1.
Figure 3:
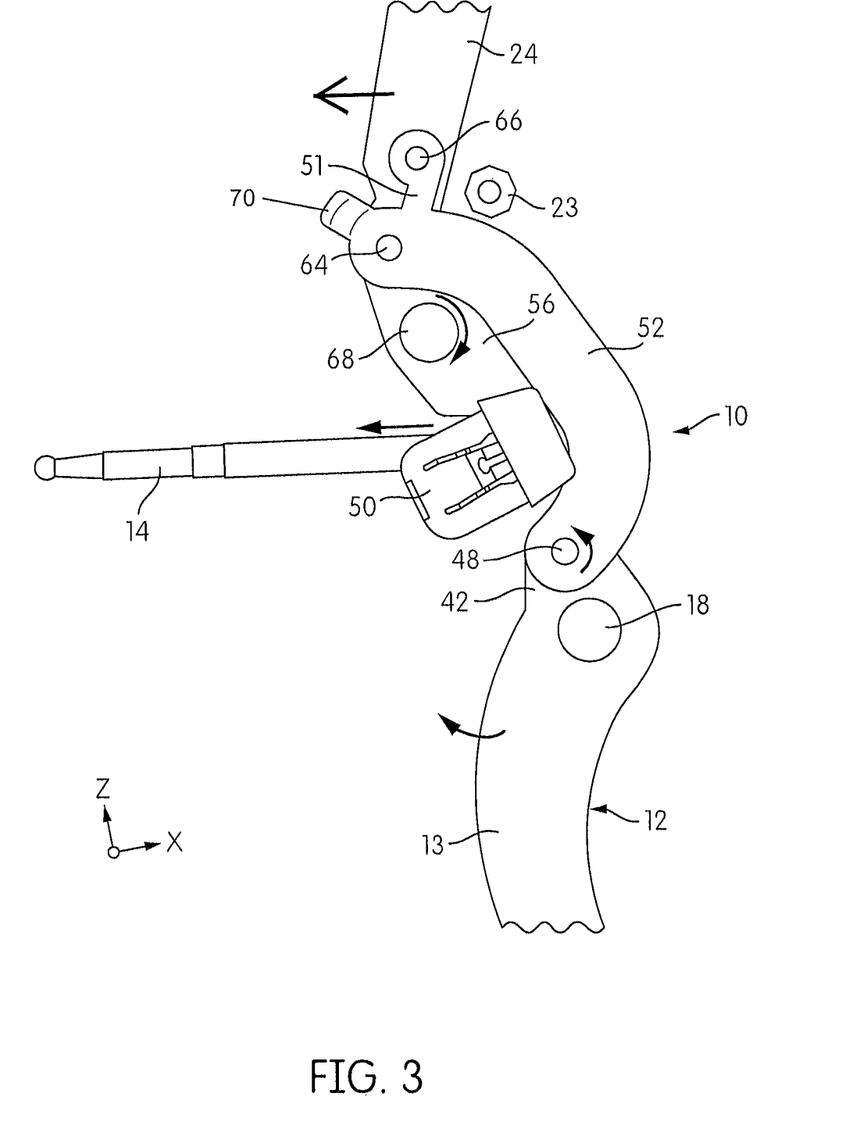
FIG. 3 illustrates a side view of links of the pedal structure of FIG. 1 in accordance with an embodiment of the present invention.

As shown in greater detail in FIG. 3, push rod 14, which may comprise a larger portion and a smaller portion, assists in translating an applied force on the pedal plate 16 to the booster 28. A pedal arm 12 is not directly connected to an end 17 (see FIG. 2) of the push rod 14 or directly connected to a single link or a bracket that is directly connected to the end 17 of the push rod 14. Rather, the pedal arm 12 is connected to the push rod 14 via an actuation link 56 and an intermediate link. The end 17 of the push rod 14 is generally mounted to a retainer 50 that is connected to the actuation link 56.

Figure 4:
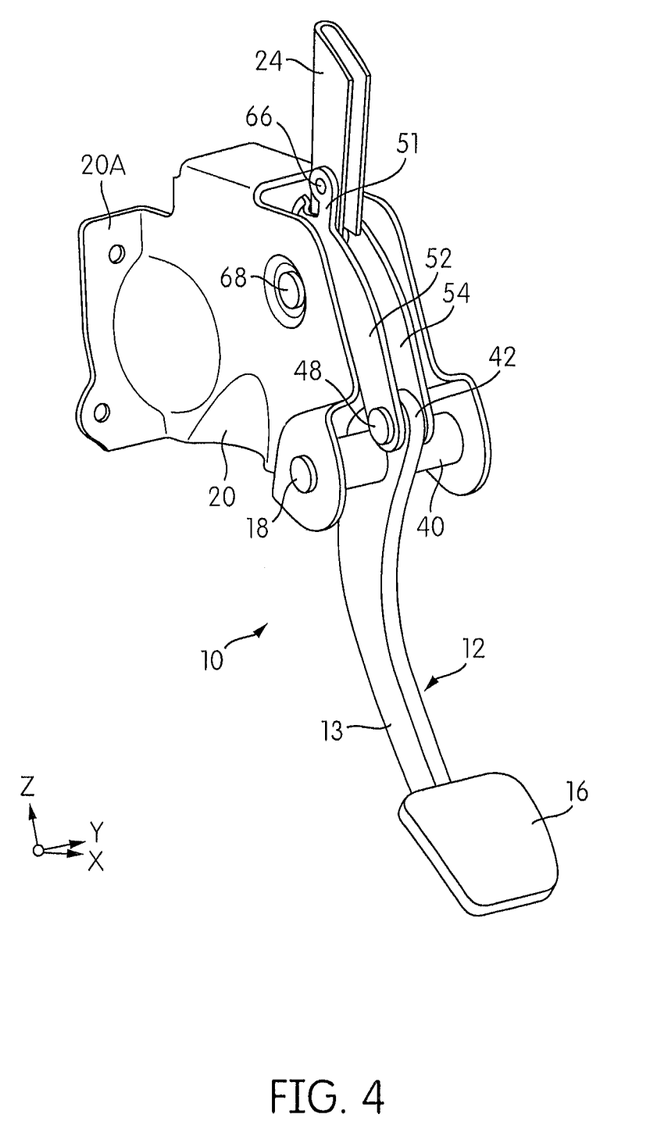
FIG. 4 shows a perspective view of the pedal structure of FIG. 1.

More specifically, as shown in greater detail in FIGS. 3 and 4, the first end of the elongated structure 13 is pivotally connected to an intermediate link via an extension portion 42. The intermediate link is a secondary link that is configured to provide a variable ratio of braking force, e.g., so that the ratio of movement applied to the pedal arm 12 is translated with increased force more quickly. As shown in FIG. 4, the intermediate link has a first link 52 and a second link 54 arranged in a parallel configuration. A first end (or a portion adjacent to the first end or a center portion) of each of the first and second links 52 and 54 is configured to be pivotally connected to an actuation link 56 (see FIG. 3) and a second end of each of the first and second links 52 and 54 is configured to be pivotally connected to the pedal arm 12. As detailed further below, the intermediate link provides the releasable connection between the push rod 14 and the pedal arm 12, thereby allowing the pedal assembly 10 to function under normal operational circumstances. Thus, as force is applied to the pedal, the pedal arm 12 pivots and the push rod 14 moves to activate the functional system (e.g., to compress a spring or mechanism corresponding to the brake booster 28). When force is released from the pedal, the spring or mechanism of the functional system/brake booster 28 releases its energy (e.g., due to its compression) to provide a spring force to move the pedal back to a neutral position, for example.

The actuation link 56 is configured to connect the push rod 14 to the intermediate links and to enable pushing of the push rod 14 via pivotal movement of the intermediate link as a result of pivoting of the pedal arm 12. In the illustrated embodiment, the actuation link 56 can also be referred to as a booster receiver link, as it connects the brake booster 28, push rod 14, and pedal assembly 10.

The exploded view of FIG. 2 illustrates each of the parts of the pedal assembly 10 in greater detail, in accordance with an embodiment herein. A pivot tube 40 or shaft is provided in the first end of elongated structure 13. The pivot tube 40 has an opening 44 therethrough for receipt of bushing portions 38A and 38B that contain primary pivot pin 18, for pivoting the pedal arm 12. Extension portion 42 extends above the pivot tube 40. Extension portion 42 has an opening 46 for receipt of a pivot pin 48. Pivot pin 48 is configured to attach first and second links 52 and 54 of the intermediate link as well as attach the intermediate link to the pedal arm 12. As shown, pivot pin 48 is designed for insertion through an opening 53 in the second end of first link 52, through opening 46 of elongated structure 13, and through an opening 59 in the second end of second link 54, and is secured.

Figure 6:
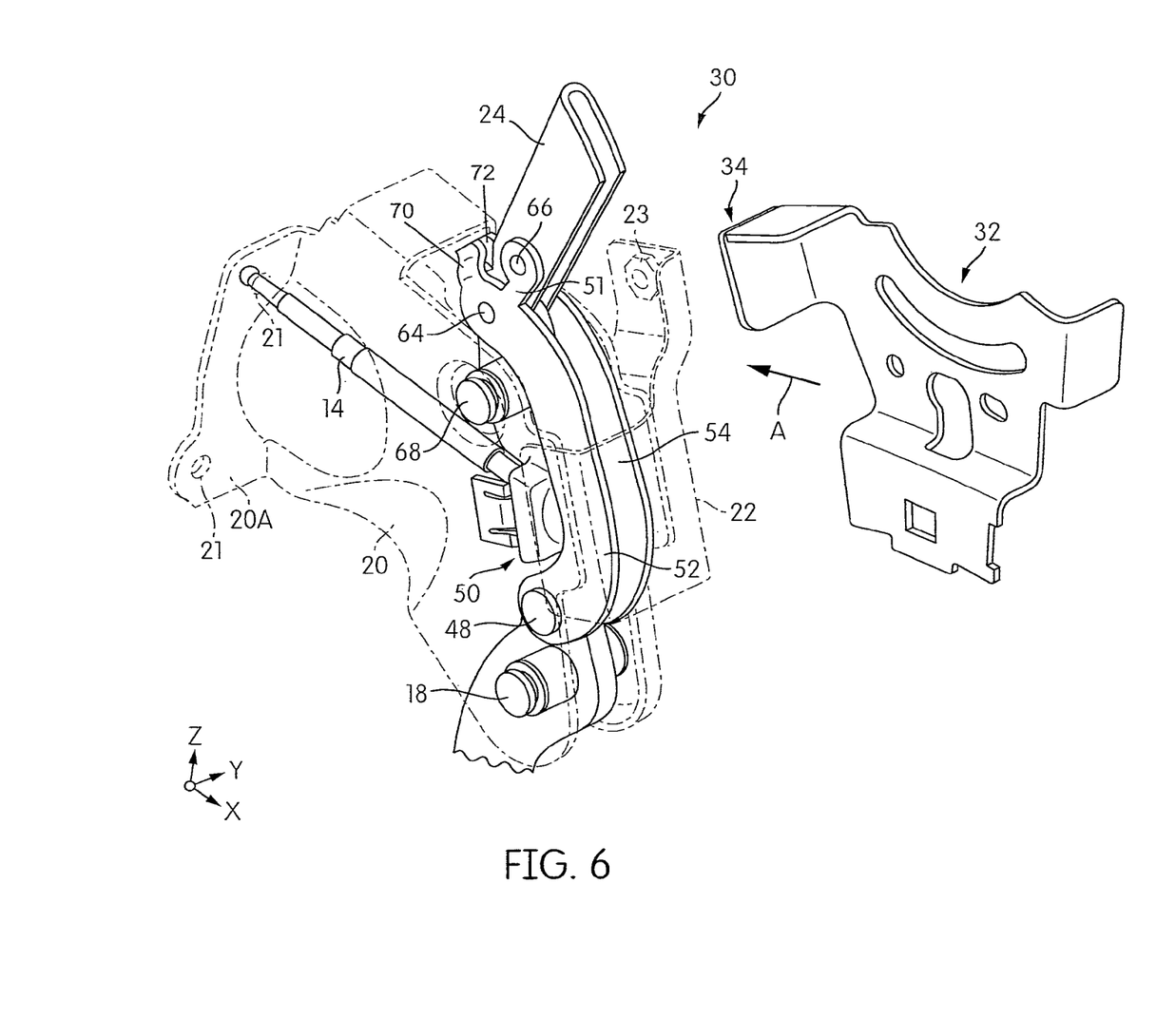

As previously noted, the first end of each of the first and second links 52 and 54 of the intermediate link is pivotally connected to the actuation link 56. The actuation link 56 is provided substantially between first link 52 and second link 54. Connector pin 64 is configured to connect first and second links 52 and 54 of the intermediate link with the actuation link 56. As shown, connector pin 64 is designed for insertion through a receiving hole 55 in the first end of first link 52, through receiving opening 63 at a first end of actuation link 56, and through a receiving hole 61 in the first end of second link 54. The first and second links 52 and 54 of intermediate link are secured to actuation link 56 via connector pin 64. In an embodiment, the connector pin 64 has splines that bite into material of the holes 55 and 61 of first and second links 52 and 54 (respectively), to assist in holding the links 52 and 54 relative to the actuation link 56. The first end of first link 52 also includes a tab 70 and the first end of second link 54 includes a tab 72. The tabs 70 and 72 extend from the ends of the links 52 and 54, respectively, and are curved towards each other such that their ends are adjacent one another. As shown in FIG. 6, the tabs 70 and 72 are curved or bent inwardly towards one another behind a release lever 24 when assembled. A space may be provided between adjacent ends of the tabs 70 and 72, such that they are relatively close to one another, or, in another embodiment, the ends of the tabs 70 and 72 may touch.

As shown in FIG. 2, in one embodiment, first link 52 of intermediate link has an extension arm 51 with a receiving area 57. The receiving area 57 is configured to receive a shear pin 66 therethrough (see also FIG. 3) and connect the first end of the first link 52 to the release lever 24 when the release lever 24 is in its first position. The shear pin 66 is configured to releasably fix release lever 24 and the links 52 and 54 relative to one another. As further described in detail later, the release lever 24 is configured to disconnect the first and second links 52 and 54 of the intermediate link from the actuation link 56 in the second position via shearing of the shear pin 66 and by forcing the first and second links 52 and 54 relatively apart so as to disconnect the intermediate link from the actuation link 56. Thus, the pedal arm 12 and push rod 14 are disconnected.

Of course, although the shear pin 66 is shown connected through receiving area 57 in extension arm 51 of first link 52, it should be understood that second link 54 of intermediate link can also, or alternatively, include a receiving area for a shear pin. Further, it is envisioned that in an embodiment, the shear pin 66 can connect a portion of at least one of the links 52 and/or 54 to the release lever 24 in a different area, or even without the use of receiving area 57.

Referring back to FIG. 2, a second pivot tube 60 or shaft is also provided in the actuation link 56. The second pivot tube 60 has an opening therethrough for receipt of bushing portions 62A and 62B that contain secondary pivot pin 68 for pivoting the actuation link 56 relative to the bracket 20. As shown in FIG. 3, the secondary pivot pin 68 is provided below opening 55 (and opening 63, not shown) when the first and second links 52 and 54 and actuation link 56 are assembled. Opening 63 in actuation link 56 is provided above the secondary pivot tube 60.

At a second end, actuation link 56 has a receiver portion 58. Receiver portion 58 is configured to receive retainer 50 therein. Retainer 50 is a quick-fit connector or bracket, for example. Retainer 50 is shaped to receive the end 17 of the push rod 14 for mounting therein, so that pivotal force from the rotation of actuation link 56 about secondary pivot pin 68 is translated to move push rod 14, as shown in FIG. 3. In an embodiment, such as shown in FIG. 2, the push rod end 17 comprises a substantially round or circular shape. The shape of the end 17 assists in providing a cooperative connection with the retainer 50 and a smooth release of the push rod 14 during an incident. In an embodiment, retainer 50 comprises a cutout or receiving area to accept the substantially round end portion 17 of the push rod 14. In an embodiment, the receiving area comprises inner walls whose surfaces are shaped or contoured to correspond to the shape of the push rod end 17. The substantially circular or rounded end 17 and the inner walls assist in providing a secure connection that does not require permanent fastening devices. Generally, receiver 50 is configured to receive and lock the end portion 17 of the push rod 14 therein when the release lever 24 is in the first position or in the second position.

Figure 5:
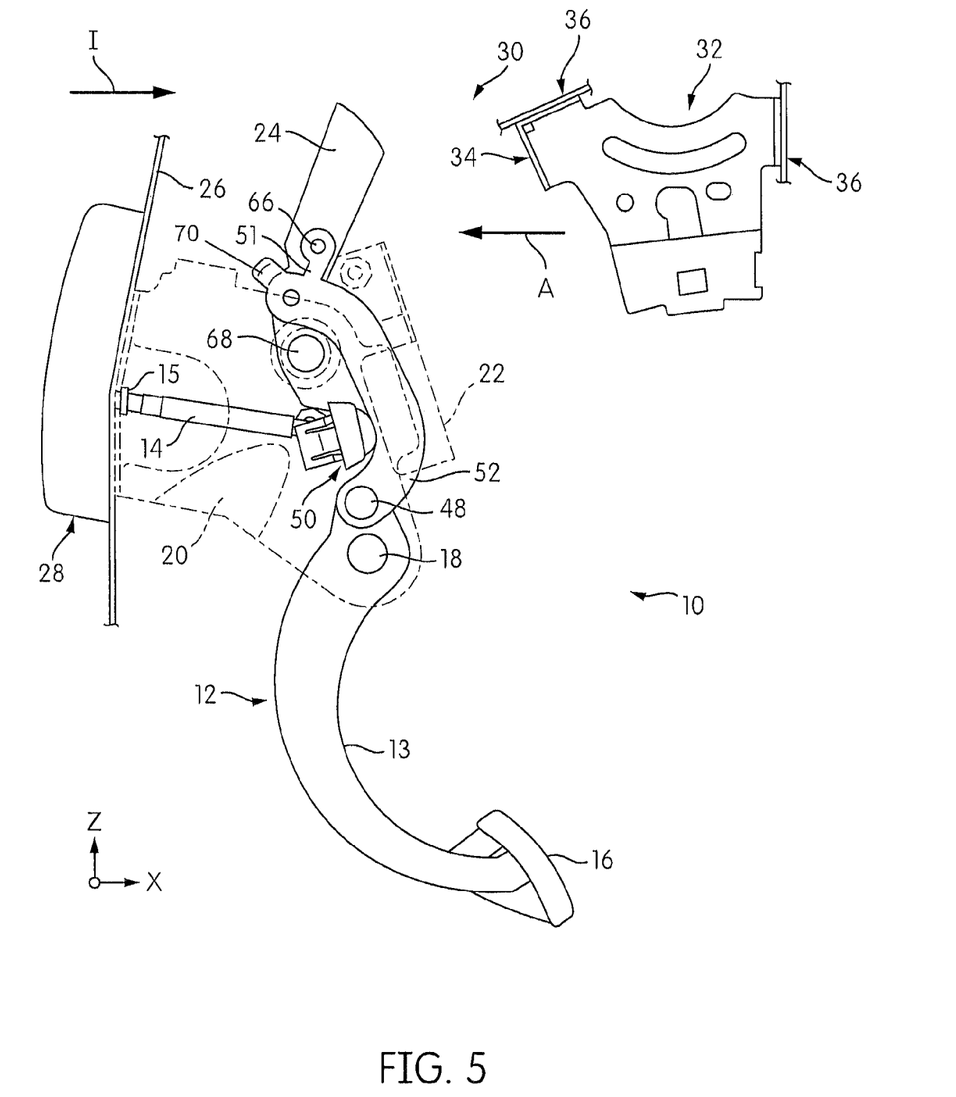
FIGS. 5 and 6 show a side and a perspective view, respectively, illustrating actuation of the actuation mechanism of the pedal structure of FIG. 1 upon a collision.

When assembled, at least the actuation link 56 and a part of each of the first and second links 52 and 54 of intermediate link are encased by pedal bracket 20, as seen in FIG. 4 and FIG. 5. The primary pivot pin 18 is connected and secured through openings 23 on either side at a bottom end of the pedal bracket 20. Secondary pivot pin 68 is connected and secured through openings 27 on either side at a top end of the pedal bracket 20. Reinforcement bracket surrounds a front portion of pedal bracket 20 and is connected to the pedal bracket 20 and/or one of the vehicle structures. Both pivot pins 18 and 68 are secured within side surfaces of the mounting bracket 20 and relative to reinforcement bracket 22, while still providing a slight clearance therebetween to allow for unobstructed rotation of the pedal arm and intermediate link.

In accordance with the above structure, at the time of normal (braking) operation, a user or operator depresses pedal plate 16 in forward direction with their foot, rotating the pedal arm 12 about primary pivot pin 18 with respect to the dash 36 and vehicle structure 26. As shown by arrows in FIG. 3, when stepping force is applied to the pedal plate 16, the pedal arm 12 swings forwardly (clockwise) and rotates about a generally horizontal axis towards the front of the vehicle using the primary pivot pin 18. The pivoting motion of the pedal arm 12 pivots the second ends of the intermediate links 52 and 54 (swings counterclockwise) around pivot pin 48, which in turn moves actuation link 56 and cause pivoting about a generally horizontal axis using secondary pivot pin 68. Specifically, the first ends of the intermediate link swing the actuation link 56 forwardly (clockwise) around secondary pivot pin 68, moving receiver portion 58 at the second end of actuation link 56 in a substantially forward direction. Therefore, the push rod 14 is pushed towards the front of the vehicle to operate the braking system. Generally, when force is applied, the spring or mechanism of the brake booster 28 is compressed. Use of the illustrated variable ratio (braking) structure to push the push rod 14 via intermediate links 52 and 54 and actuation link 56 improves the operational feeling of the pedal and allows for setting the pedal ratio to a desired value.

Generally, when the pedal is a brake pedal, should a driver encounter a situation that may result in an incident, for example, the driver will quickly and forcefully apply force via his foot to the pedal part 16 of the pedal 10. Should impact or collision from such an incident occur (e.g., caused by inertia, kinetic energy, etc.), however, the forces of the impact may cause relative movement of the vehicle structure (and its parts and the driver) and the front of the vehicle, as noted above. Thus, the pedal 10 includes a release mechanism 30 to assist in disconnecting or decoupling at least part of the pedal 10 from the vehicle structure. Generally speaking, the reaction mechanism 30 is used to disconnect a part of the pedal assembly 10 from the vehicle (e.g., the push rod 14 from the pedal structure 13, via the intermediate link 52), and prevent energy from being transmitted to a driver's foot.

One element of the release mechanism 30 is a release lever 24, which, under normal circumstances, is inactive and does not interfere with the connection of the push rod 14 to the elongated structure 13 of the pedal arm 12. The release lever 24 is capable of rotating or pivoting between a first position and a second position. As shown in FIG. 3, the release lever 24 is capable of rotating or pivoting about a pivot axis or pivot point along a generally horizontal axis that is in line with connector pin 64 and parallel to the axis of secondary pivot pin 68. As will be further described, the release lever 24 has a contact portion that can be contacted to pivot the lever 24 between first and second positions. The release lever 24 can be mounted at an angle (e.g., see FIG. 5) towards a cabin of the vehicle, for example, in its first position, such that contact with its contact portion causes a larger amount of pivotal or rotational movement once contacted. A portion of the release lever 24 surrounds the connector pin 64 adjacent the first ends of the first and second links 52 and 54 of the intermediate link. As shown in FIG. 2, release lever 24 is a substantially U-shaped structure that includes hooks or claws at its bottom end to substantially wrap around the connector pin 64, between the first link 52 and second link 54. Actuation link 56 is positioned substantially between its sides, adjacent to or within a center portion thereof.

The release lever 24 may be designed to be partially enclosed within the pedal mounting bracket 20, for example. In some cases, the release lever 24 comprises ends which are secured within side surfaces of the pedal bracket 20, while still providing a slight clearance therebetween to allow for rotation of the release lever 24.

In addition to providing transmission of brake forces, the intermediate links 52 and 52 enable the push rod 14 to be releasably connected to the pedal arm 12. The release lever 24 is configured to disconnect from the first and second links 52 and 54 of the intermediate link via breaking of shear pin 66. Rotation of the release lever 24 (e.g., in a counter clockwise direction) and into its second position can break the shear pin 66, thus releasing a connection of extension arm 51 of first link 52 and release lever 24.

Figure 9:
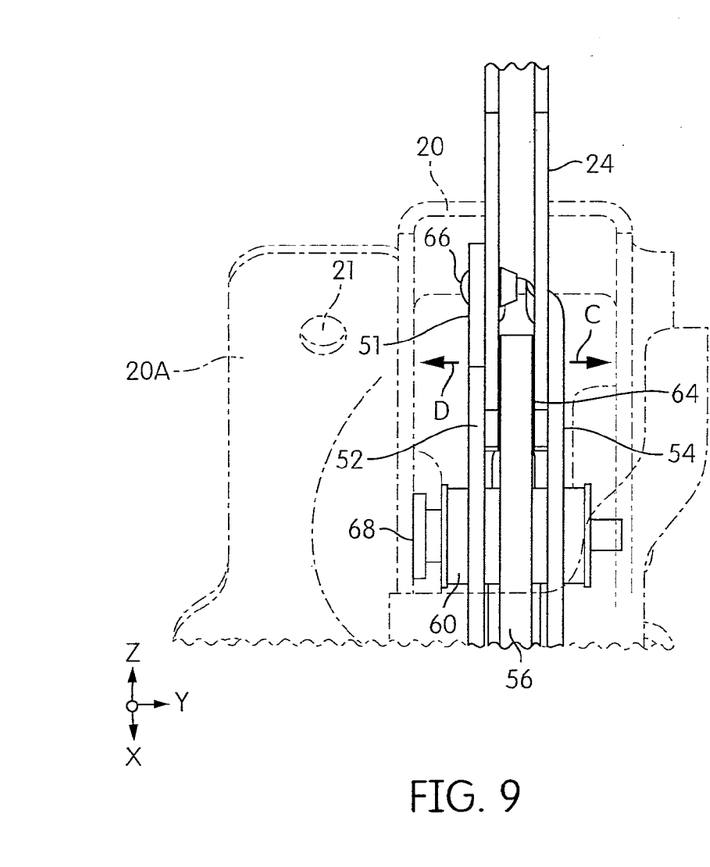
FIG. 9 illustrates a detailed, front perspective view of the release lever and connected links of the pedal structure of FIG. 1 before actuation.

In accordance with an embodiment, the first ends of the first and second links 52 and 54 of the intermediate link are configured to move in a substantially horizontal direction relative to and away from the actuation link upon disconnection of the first and second links of the intermediate link from the actuation link (see FIG. 9). More specifically, when the shear pin 66 is broken and the connection released, the release lever 24 continues to rotate and moves into the space between the tabs 70 and 72 of the first ends of the first and second links 52 and 54, thereby separating the tabs 70 and 72 and moving them substantially horizontally and relatively away from each other (see FIG. 10). Then, as shown and described later with respect to FIGS. 9 and 10, the first link 52 and second link 54 are capable of moving and forced away from each other, the connector pin 64, and the actuation link 56, to disconnect therefrom. The release lever 24 thus forces the first and second links 52 and 54 to disengage from the connector pin 64 as it rotates to its second position. The links 52, 54 are relatively forced apart (away from each other) by the rotation of release lever 24. The casing of the pedal bracket 20 that surrounds at least a portion of the intermediate links can be configured to limit horizontal and relative movement of the first and second links of the intermediate link away from the actuation link.

The release mechanism 30 also has an actuation mechanism 32 mounted to the vehicle 36, as shown in FIG. 1. The actuation mechanism 32 is spaced in relation to a contact portion of the release lever 24, such that the actuation mechanism 32 and the contact portion of the release lever 24 are out of contact with each other during normal operation of the pedal assembly 10 in the vehicle. As shown in FIG. 1, for example, the actuation mechanism 32 may comprise a reaction bracket. The reaction bracket 32 is mounted to the vehicle structure 36 in a manner such that it is capable or configured to contact a contact portion of the release lever 24, during an incident to thereby actuate the rotation of the lever 24. The reaction bracket 32 may be mounted via fasteners 34a, for example, as known in the art, or other methods such as welding. A front portion 34 of the actuation mechanism 32 is configured to contact the contact portion during collision or crash. The actuation mechanism 32 is configured to actuate the rotation of the release lever 24 during incident of the vehicle, so as to actuate the pivoting of the release lever 24. Specifically, the release lever 24 may be contacted or forced by actuation mechanism 32 such that it rotates from the first position to the second position, thereby allowing the push rod 14 to be disconnected from the pedal arm 12. In some embodiments, the vehicle structure 36 may be a steering column, an instrument panel (IP), or a cross beam, for example. In some embodiments, the vehicle structure 36 may include other structural parts of the vehicle, and therefore should not be limiting.

Figure 7:
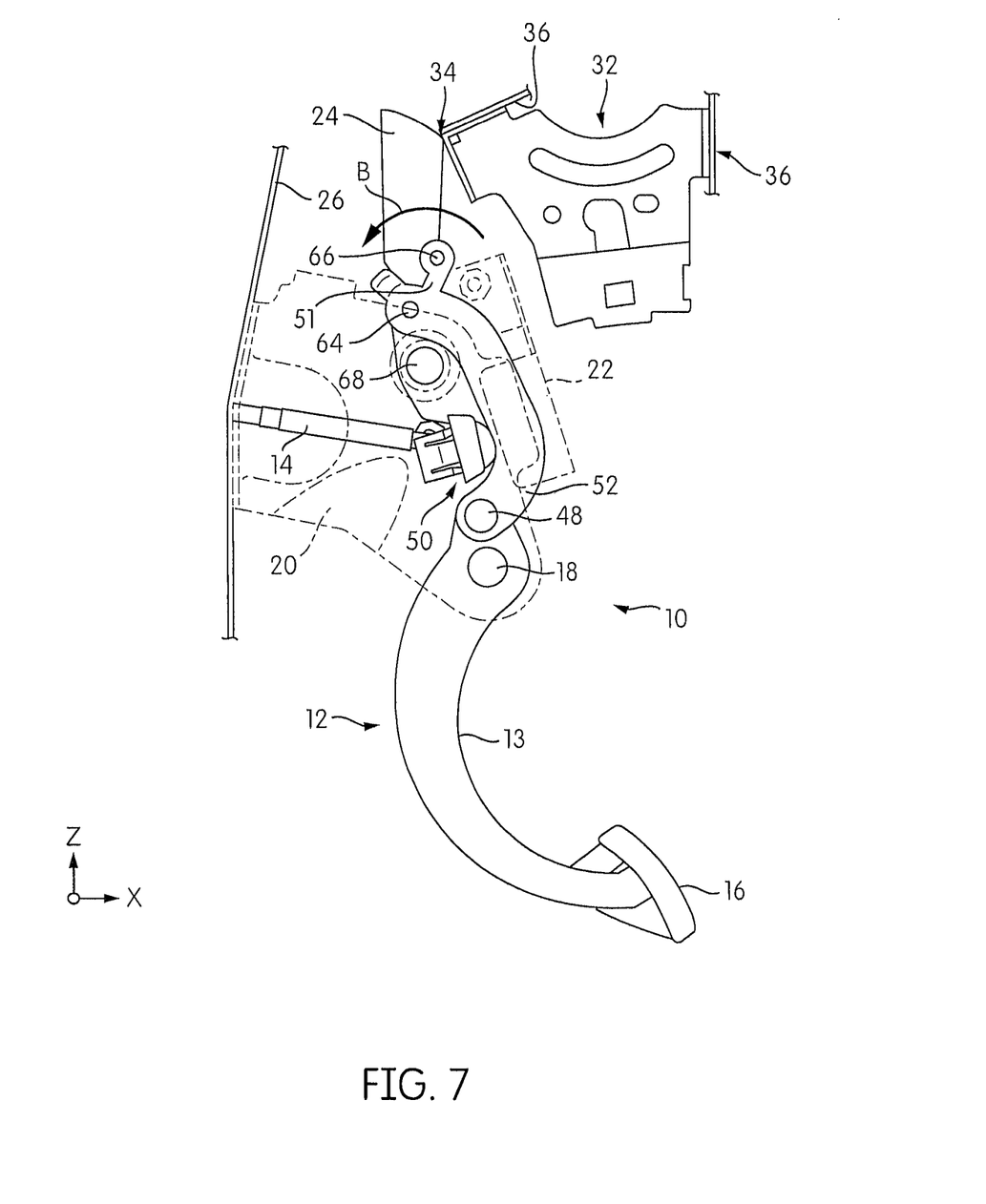
FIGS. 7 and 8 show a side and a perspective view, respectively, illustrating the movement of the release lever after actuation during a collision.
Figure 8:
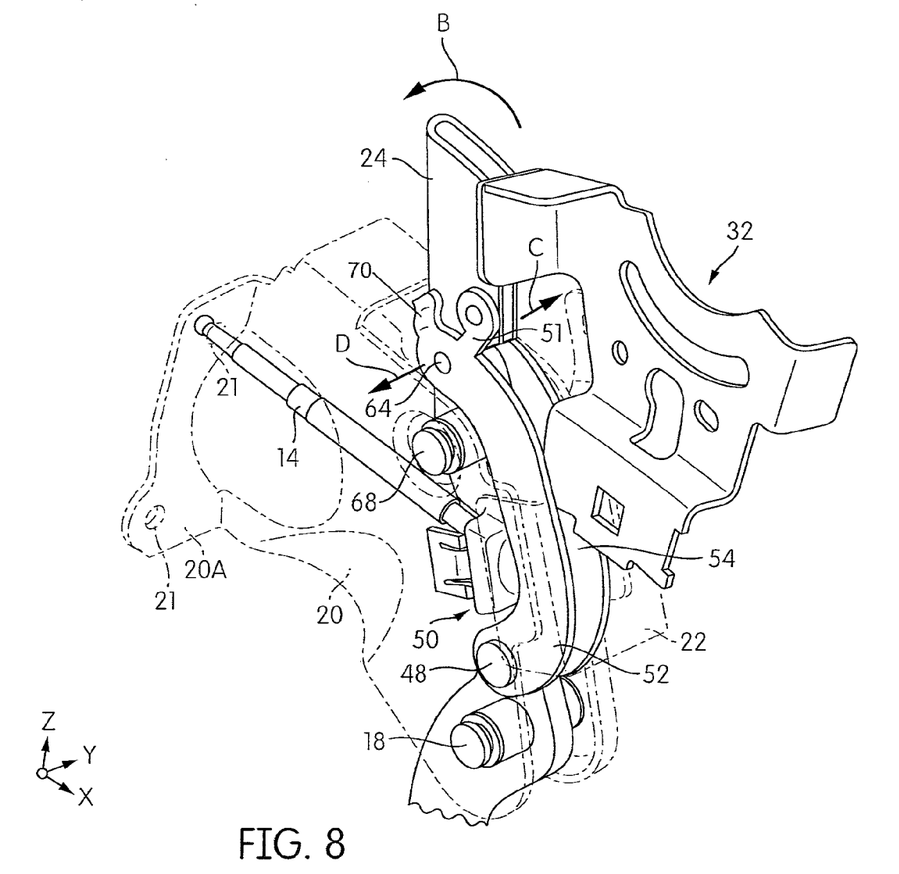
Figure 10:
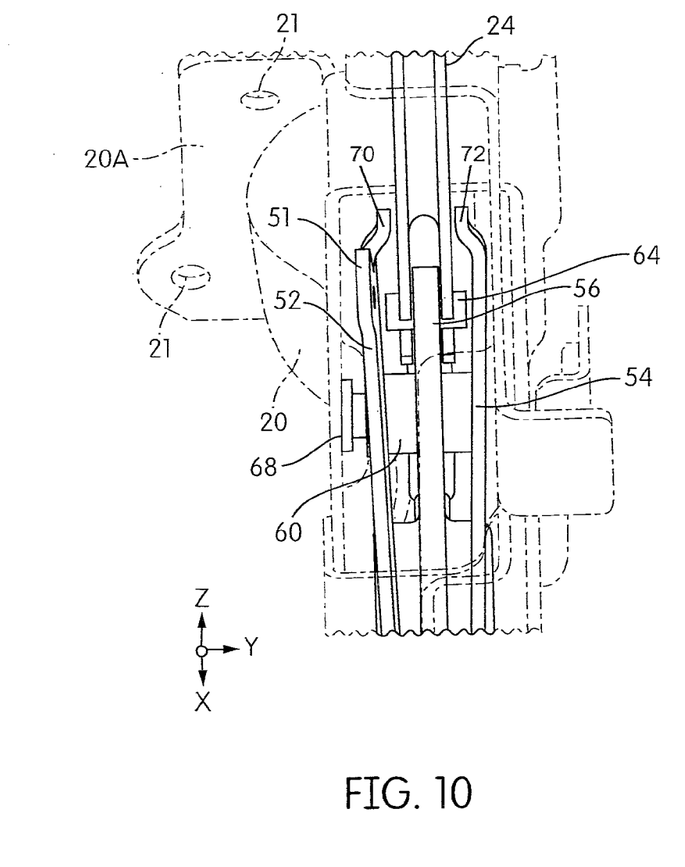
FIG. 10 illustrates a detailed, front perspective view of the release lever and disconnected links of the pedal structure of FIG. 1 after actuation.

FIGS. 5 and 6 illustrate an example of the release lever 24 in a first position. The first position may be defined as a position for mounting or holding a push rod 14 such that it is mechanically connected to the pedal arm 12 and activates a functional system of the vehicle during normal operating circumstances. FIGS. 7 and 8 illustrate the release lever 24 in a second position. The second position may be defined as a position for disconnecting or decoupling the push rod 14 from the pedal arm 12. When the release lever 24 is rotated about the axis through connector 64, an end 17 of the push rod 14 is disconnected or decoupled from operation via force received from the pedal arm 12, because the links 52 and 54 of the intermediate link are decoupled, as shown in FIG. 10.

Generally, the actuation mechanism 32 is configured to actuate rotation of the release lever 24 during an incident upon relative movement of the vehicle structure 36 and at least a part of a front part of the vehicle (e.g., the lower dash or firewall 26). The location of the actuation mechanism 32 should not be limiting. For example, the actuation mechanism 32 may be mounted or provided in a relative location that is substantially above or below the release lever 24. Additionally or alternatively, the actuation mechanism 32 may be provided on a left side or right side, relative to the pedal (e.g., located on the left or right side in relation to the pedal arm 13). The actuation mechanism 32 may be mounted in a position that is closer to the driver than a mounting position of the release lever 24 during normal operation of the vehicle, or, alternatively, the mechanism 32 may be mounted in a position that is further from the driver than a mounting position of the release lever 24.

FIGS. 5-8 illustrate the pedal 10 and release mechanism 30 as they are actuated during an incident. Specifically, a driver or user may apply a pedal force via his foot to the pedal plate 16 of the pedal arm 12 to apply a braking force to wheels of the vehicle, for example. Upon the occurrence of an incident, such as a frontal collision with another object, the front part of the vehicle, vehicle structure 26 and the vehicle structure 36 and its corresponding parts (e.g., parts and structures inside the cabin) move relative to one another. For example, the front part of the vehicle may undergo deformation such that it moves in a relative direction I as a result of impact force, while the vehicle structure 36 moves in a relative direction A. As shown in FIG. 5, the front of the vehicle (including the structure 26) and the vehicle structure 36 move relative to each other such that the space therebetween becomes compacted. In some embodiments, the actuation mechanism 32 and the brake system (or its booster 28) are moved relative to each other during the incident. Nonetheless, as the front part of the vehicle and vehicle structure 36 are moved with respect to each other, the actuation mechanism 32 or reaction bracket and release lever 24 are moved relative to each other. Thus, the front portion 34 of the reaction bracket 32 may be forced into contact with release lever 24, thereby rotating the lever 24 about its pivot axis in a direction B, shown in FIG. 7. Rotation in direction B causes the release lever 24 to rotate the release lever 24 from the first position to the second position. Then, after rotation, the intermediate link is disconnected from the actuation link 56, and thus the pedal arm 12 and push rod 14 are also disconnected. Specifically, as shown in FIGS. 8 and 9, as the release lever 24 rotates in to the second position, the shear pin 66 is broken by the motion of release lever 24. As the release lever 24 continues to rotate (e.g., by the moving force of bracket 32) into its second position, it forces the first and second links 52 and 54 relatively apart from one another by moving between respective adjacent tabs 70 and 72 of the links 52 ad 54. The first link 52 and second link 54 are configured to move generally horizontally and relatively away from each other and away from actuation link 56 in a direction depicted by arrows D and C, respectively, as the release lever 24 spreads the tabs 70 and 72 apart from one another. As a result, as shown in FIG. 10, at least a first end of the first and second links 52 and 54 are moved off of connector pin 64, thereby disconnecting with the actuation link 56. Thus, the pedal arm 12 of the pedal 10 is able to pivot about primary pivot pin 18, and reactionary forces are not distributed to either the brake booster 28 or towards the foot of the user, thereby reducing injury to the driver or user (e.g., the ankles, shins, or knees of the driver).

In accordance with an embodiment, an alternative direction may be used for the pivot axis of the links 52 and 54 of the intermediate link. In another embodiment, a third link may be used. In the case of the release lever 24 being rotational or pivotal about an axis that is provided 90 degrees from the illustrated axis, i.e., in a substantially vertical or longitudinal configuration, the actuation link 56 would still be disconnected and may be guided to move in a relatively left or right direction in the event of an incident.

The directional references used herein and the directional arrows in the Figures are used in a relative sense. That is, they are being used to describe movement of parts relative to one another, and are not being used in "absolute" terms. For example, in a front end collision with a stationary object, the front end parts would be more stationary with the inertia of structures towards the actual user of the vehicle moving forward by inertia. Likewise, where the vehicle is stationary and struck in its front end, the front end parts would be predominantly moving rearwardly in an absolute sense. But in either sense, the motion of those parts can be described as in a rearward direction in a relative sense with respect to the pedal and the vehicle structure 36 to which the actuation mechanism 32 is attached.

Also, it should be understood by one of ordinary skill in the art that, although both links 52 and 54 are shown and described as moving in a relatively horizontal direction away from each other (e.g., see FIG. 9), such illustrations are not intended to be limiting. The links 52 and 54 of intermediate link need not move together or at the same time. For example, in accordance with one embodiment, one of the links 52 or 54 may be forced away from the other link, and disconnected from connector 64. Forces can then spread or force the other link away from the disconnected link to disconnect it from the connector 64.

As has become evident, the structures in the pedal assembly 10 and release mechanism 30 as herein described provide several advantages over the prior art. Besides minimizing or preventing injury to a driver's lower extremities, one difference between this mechanism and other known solutions is that the release lever 24 provides multiple functions using a single element. That is, the lever 24 is inactive under in normal operation circumstances (allowing the push rod 14 to be activated by pushing on the pedal plate 16), and can directly decouple the operation of the devices in the event of an incident or collision. So, besides providing a pedal decoupling assembly which reduces injury to a driver as well as reduces broken connection and space limitations, it also provides an improved decoupling assembly that reduces injury in a variable ratio braking system.

Additionally, this disclosure provides a design that is more flexible and easier to package than prior art devices. A fewer number of replacement parts (e.g., intermediate links 52 and 54, release lever 24, bracket 32) may be replaced for reassembly of the pedal assembly. Such a design particularly may allow for less costly and time consuming repairs after an incident.

Furthermore, the herein described device can substantially reduce the number of parts to be used. Known systems generally require a larger number of parts, and therefore are tedious, require more money, and more time for assembly.

Though the preferred setting for this invention is as a crash decoupler or disconnection device for brake and/or clutch pedals, it should also be noted that it is envisioned that in some embodiments the above-described release mechanism 30 could also be employed to disconnect a spring assembly on brake or clutch pedals, or on brake-by-wire and clutch-by-wire units. Furthermore, as previously noted, it is envisioned that although the pedal 10 is described as being used as a brake pedal for a brake system in a vehicle, the pedal 10 may be also be used for other systems and in other types of vehicles (e.g., trucks, trailers, or similar machinery such as construction equipment).

Also, it should be noted that the pedal assembly 10 may also be used in combination with any number of sensing devices or sensors, such as, but not limited to, speed-sensing sensors (i.e., speed the vehicle is traveling) or air bag deployment sensors. Additionally, in some instances, it is envisioned that a predetermined amount of force or vehicle travel speed must be met in order for the pedal structure to be released.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A pedal assembly for operating a push rod that activates a functional system of a vehicle, the pedal assembly comprising:
   a pedal arm comprising an elongated structure;
   an intermediate link comprising a first link and a second link in a parallel configuration;
   an actuation link;
   a first end of each of the first and second links of the intermediate link being connected to the actuation link and a second end of each of the first and second links being pivotally connected to a first end of the elongated structure of the pedal arm;
   a pedal plate provided on a second end of the elongated structure of the pedal arm, the pedal plate being accessible by a foot of a driver;
   wherein pivotal movement of the pedal arm is configured to pivotally move the intermediate link, and wherein pivotal movement of the intermediate link is configured to actuate pivotal movement of the actuation link, the actuation link being configured to connect a push rod to the intermediate link and to enable pushing of the push rod via pivotal movement of the intermediate link as a result of pivoting of the pedal arm;

a release mechanism comprising a release lever and an actuation mechanism, the release lever being separate from and movable relative to the intermediate link and being configured to pivot between a first position and a second position, the release lever having a contact portion for being contacted to pivot the release lever between the first and second positions;

wherein the release lever is configured to disconnect the first and second links of the intermediate link from the actuation link in the second position by forcing the first and second links relatively apart a wedging manner so as to disconnect from the actuation link, and the actuation mechanism being configured to mount to a vehicle structure in spaced relation to the contact portion of the release lever, the actuation mechanism configured to contact the contact portion during a vehicle collision and actuate the pivoting of the release lever from the first position to the second position to disconnect the first and second links of the intermediate link from the actuation link.

2. The pedal assembly according to claim 1, wherein the first ends of the first and second links of the intermediate link are configured to move in a substantially horizontal direction relative to and away from the actuation link upon disconnection of the first and second links of the intermediate link from the actuation link.

3. The pedal assembly according to claim 2, further comprising a casing surrounding at least a portion of the intermediate link, the casing configured to limit the horizontal and relative movement of the first and second links of the intermediate link away from the actuation link.

4. The pedal assembly according to claim 2, further comprising a connector pin configured to connect with the first end of each first and second link to the actuation link.

5. The pedal assembly according to claim 4, wherein the first ends of the first and second links disconnect from the connector pin in the second position.

6. The pedal assembly according to claim 1, wherein the release lever is configured to connect to at least one of the first and second links of the intermediate link in the first position via a shear pin, and wherein the release lever is configured to disconnect from the connected one of the at least one of the first and second links of the intermediate link in the second position via shearing of the shear pin upon pivoting of the release lever between the first position and the second position.

7. The pedal assembly according to claim 6, wherein the at least one of the first and second links of the intermediate link has a receiving area, the receiving area configured to receive the shear pin and connect the first end of the at least one of the first and second links to the release lever when the release lever is in the first position.

8. The pedal assembly according to claim 1, wherein the actuation mechanism comprises a reaction bracket, the reaction bracket configured to come into contact with the contact portion during collision thereby actuating rotation of the release lever.

9. The pedal assembly according to claim 1, wherein the actuation mechanism is mounted in a position that is closer to the driver than a mounting position of the release lever during normal operation of the vehicle.

10. The pedal assembly according to claim 1, wherein the rotation of the release lever is configured to be actuated as a result of relative movement of the vehicle structure and a front part of the vehicle during the collision.

11. The pedal assembly according to claim 1, wherein the functional system of the vehicle is a brake system or a transmission system.

12. The pedal assembly according to claim 1, wherein the vehicle structure is selected from the group consisting of: a steering column, an instrument panel, and a cross beam.

13. The pedal assembly according to claim 1, wherein the actuation mechanism and the contact portion of the release lever are out of contact with each other during normal operation of the pedal assembly in the vehicle.

14. A vehicle comprising a pedal assembly installed therein for moving a push rod that activates a functional system of the vehicle, the pedal assembly comprising:

a pedal arm comprising an elongated structure pivotally mounted to a vehicle structure within the vehicle;

an intermediate link comprising a first link and a second link in a parallel configuration;

an actuation link;

a first end of each of the first and second links of the intermediate link being connected to the actuation link and a second end of each of the first and second links being pivotally connected to a first end of the elongated structure of the pedal arm;

a pedal plate provided on a second end of the elongated structure of the pedal arm, the pedal plate being accessible by a foot of a driver;

wherein pivotal movement of the pedal arm is configured to pivotally move the intermediate link, and wherein pivotal movement of the intermediate link is configured to actuate pivotal movement of the actuation link, the actuation link connecting the push rod to the intermediate link and to enable pushing of the push rod via pivotal movement of the intermediate link as a result of pivoting of the pedal arm;

a release mechanism comprising a release lever and an actuation mechanism, the release lever being separate from and movable relative to the intermediate link and being configured to pivot between a first position and a second position, the release lever having a contact portion for being contacted to pivot the release lever between the first and second positions;

wherein the release lever is configured to disconnect the first and second links of the intermediate link from the actuation link in the second position by forcing the first and second links relatively apart a wedging manner so as to disconnect from the actuation link, and the actuation mechanism being mounted to the vehicle structure of the vehicle in spaced relation to the contact portion of the release lever, the actuation mechanism configured to contact the contact portion during a vehicle collision and actuate the pivoting of the release lever from the first position to the second position to disconnect the first and second links of the intermediate link from the actuation link.

15. The vehicle according to claim 14, wherein the first ends of the first and second links of the intermediate link are configured to move in a substantially horizontal direction relative to and away from the actuation link upon disconnection of the first and second links of the intermediate link from the actuation link.

16. The vehicle according to claim 15, further comprising a casing surrounding at least a portion of the intermediate link, the casing configured to limit the horizontal and relative movement of the first and second links of the intermediate link away from the actuation link.

17. The vehicle according to claim 15, further comprising a connector pin configured to connect with the first end of each first and second link to the actuation link.

18. The vehicle according to claim 17, wherein the first ends of the first and second links disconnect from the connector pin in the second position.

19. The vehicle according to claim 14, wherein the release lever is configured to connect to at least one of the first and second links of the intermediate link in the first position via a shear pin, and wherein the release lever is configured to disconnect from the connected one of the at least one of the first and second links of the intermediate link in the second position via shearing of the shear pin upon pivoting of the release lever between the first position and the second position.

20. The vehicle according to claim 19, wherein the at least one of the first and second links of the intermediate link has a receiving area, the receiving area configured to receive the shear pin and connect the first end of the at least one of the first and second links to the release lever when the release lever is in the first position.

21. The vehicle according to claim 14, wherein the actuation mechanism comprises a reaction bracket, the reaction bracket configured to come into contact with the contact portion during collision thereby actuating rotation of the release lever.

22. The vehicle according to claim 14, wherein the actuation mechanism is mounted in a position that is closer to the driver than a mounting position of the release lever during normal operation of the vehicle.

23. The vehicle according to claim 14, wherein the rotation of the release lever is actuated as a result of relative movement of the vehicle structure and a front part of the vehicle during the collision.

24. The vehicle according to claim 14, wherein the functional system of the vehicle is a brake system or a transmission system.

25. The vehicle according to claim 14, wherein the vehicle structure is selected from the group consisting of: a steering column, an instrument panel, and a cross beam.

26. The vehicle according to claim 14, wherein the actuation mechanism and the contact portion of the release lever are out of contact with each other during normal operation of the pedal assembly in the vehicle.

* * * * *

UNITED STATES PATENT AND TRADEMARK OFFICE
CERTIFICATE OF CORRECTION

PATENT NO. : 9,523,998 B2  
APPLICATION NO. : 13/831245  
DATED : December 20, 2016  
INVENTOR(S) : Sukonthapanich

It is certified that error appears in the above-identified patent and that said Letters Patent is hereby corrected as shown below:

In the Claims

In Claim 1, Column 13, Line 17, insert --in-- after "apart".

In Claim 14, Column 14, Line 49, insert --in-- after "apart".

Signed and Sealed this  
Fourteenth Day of March, 2017

Michelle K. Lee  
*Director of the United States Patent and Trademark Office*